Nov. 6, 1962

E. E. LAKSO 3,061,990

ROTARY MACHINE FOR COUNTING AND FILLING TABLETS

Filed Nov. 14, 1957

INVENTOR.
EINO E. LAKSO

BY *Charles R. Fay,*

ATTORNEY

Nov. 6, 1962 E. E. LAKSO 3,061,990
ROTARY MACHINE FOR COUNTING AND FILLING TABLETS
Filed Nov. 14, 1957 4 Sheets-Sheet 2
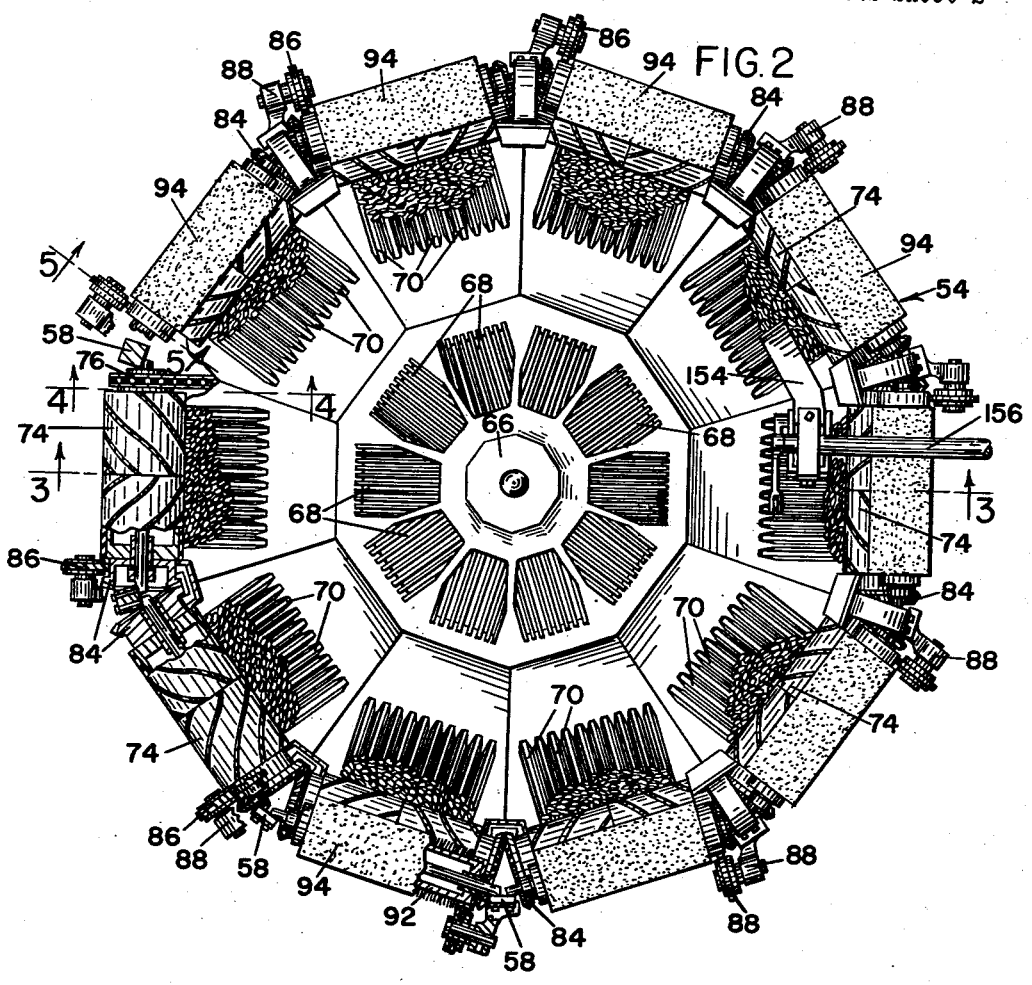
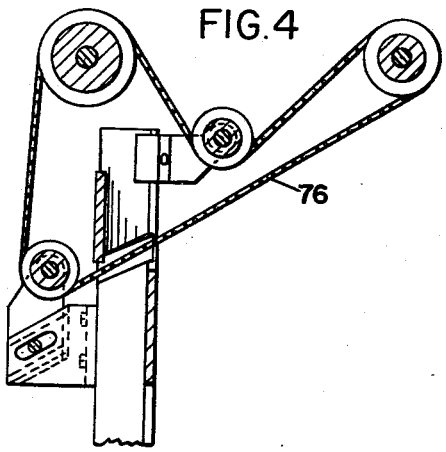
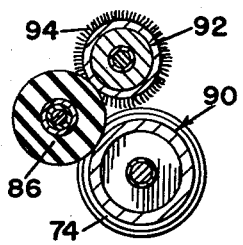
INVENTOR.
EINO E. LAKSO
BY Charles R. Fay
ATTORNEY

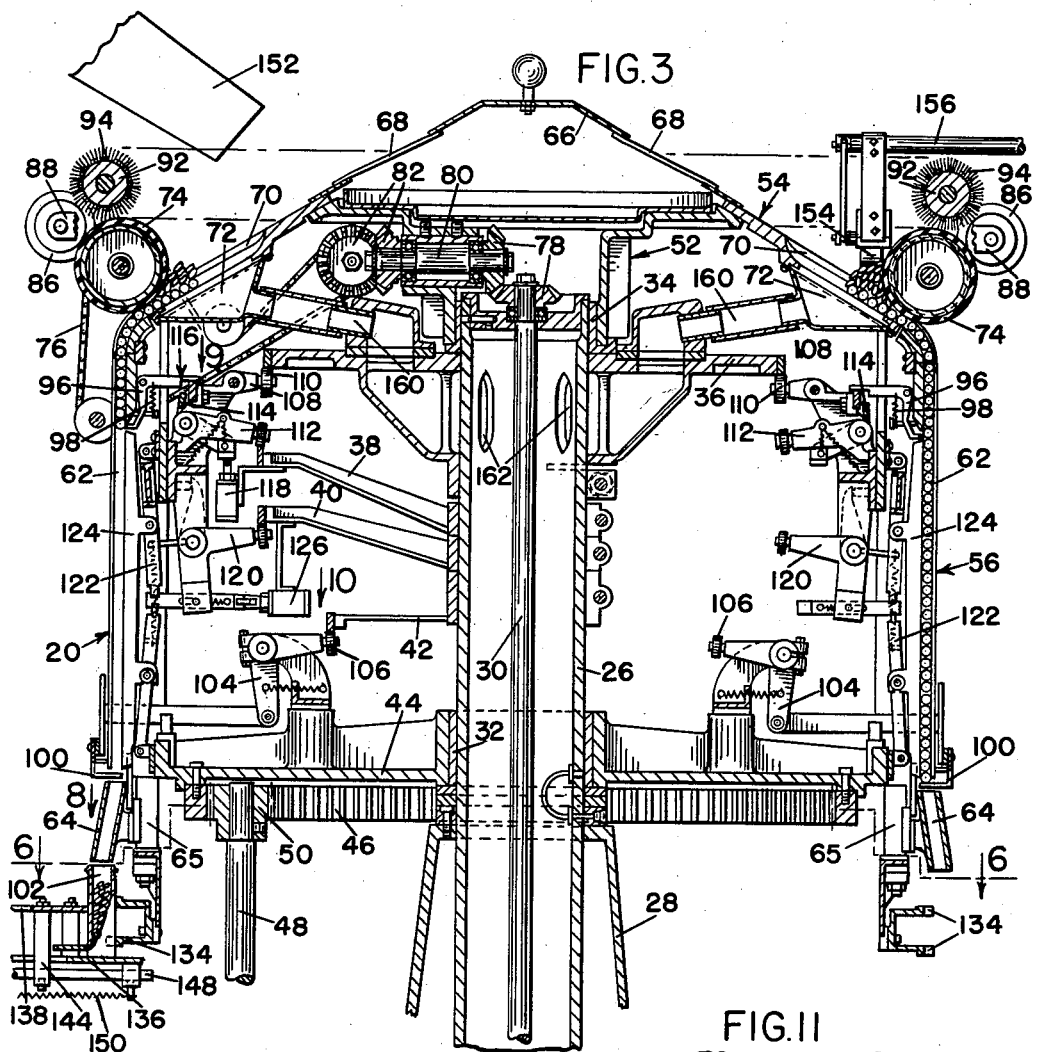
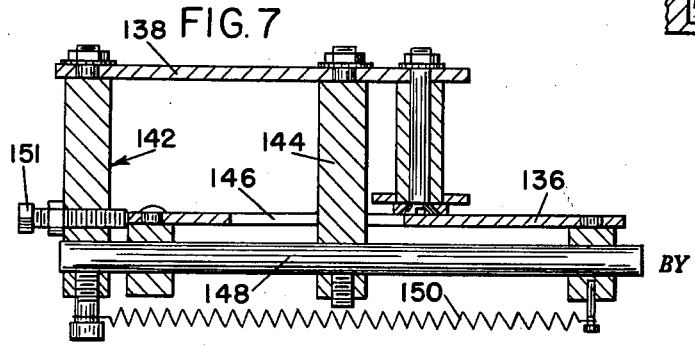

Nov. 6, 1962 E. E. LAKSO 3,061,990
ROTARY MACHINE FOR COUNTING AND FILLING TABLETS
Filed Nov. 14, 1957 4 Sheets-Sheet 4

INVENTOR.
EINO E. LAKSO
BY Charles R. Fay,
ATTORNEY

United States Patent Office 3,061,990
Patented Nov. 6, 1962

3,061,990
ROTARY MACHINE FOR COUNTING AND FILLING TABLETS

Eino E. Lakso, Fitchburg, Mass., assignor to The Lakso Company, Inc., Fitchburg, Mass., a corporation of Massachusetts
Filed Nov. 14, 1957, Ser. No. 696,527
12 Claims. (Cl. 53—237)

This invention relates to a new and improved machine for counting and filling articles such as tablets in containers, and the principal object of the invention resides in the provision of a machine for speeding up the number of containers to be filled in a certain period of time.

In carrying out the invention, the speed of filling is increased by the utilization of a continuously rotating turret having mounted thereon a series of counting and filling units, each unit comprising a plurality of chutes which direct the tablets from an overhead hopper to the containers, the containers being arranged to rotate with the turret for a short portion of each rotation, the containers being held in fixed relation to the chutes, whereby the turret may be continuously rotated to fill the containers at one side of the machine, the turret being provided with mechanism for re-charging the chutes at the other side of the machine. That is, the turret is rotated, the tablets are counted and deposited for filling along an arcuate path at one side of the axis of the turret and the containers are then moved away from the turret, the turret continuing its rotation into another section or station for re-charging the chutes, so that the tablets are continuously being discharged into containers and at the same time being continuously re-charged or filled as to the chutes for a high speed continuous counting and filling operation.

Other objects of the invention include the provision of a turret as aforesaid containing a single hopper in the upper portion thereof above the chutes, said hopper having a continuous feed of tablets thereto and preparing tablets in alignment to allow for the chutes being filled quickly upon operation of mechanism for each chute to allow the aligned tablets in the hopper to descend into the chutes against a lower stop, thus counting the tablets and preparing the same for discharge upon removal of the lower gate as each unit once more rotates into cooperative relationship with containers to be filled.

The invention further relates to arrangements and combinations of parts which will be hereinafter described and more particularly pointed out in the appended claims.

Reference is to be had to the accompanying drawings, in which:

FIG. 2 is a top plan view of the turret, looking in the direction of arrow 2 in FIG. 1;

FIG. 3 is a vertical sectional view, taken on line 3—3 of FIG. 2;

FIGS. 4 and 5 are enlarged sections on the corresponding lines in FIG. 2;

FIG. 7 is an enlarged section on line 7—7 of FIG. 6;

Figure 8:
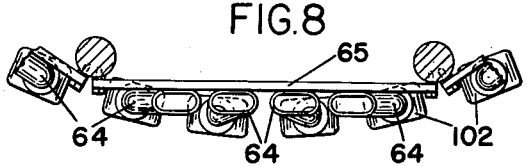
Figure 10:
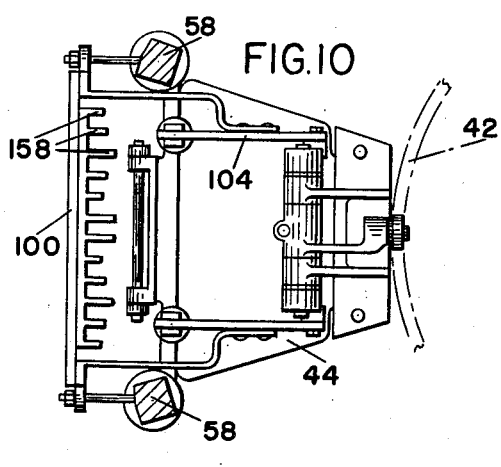
Figure 9:
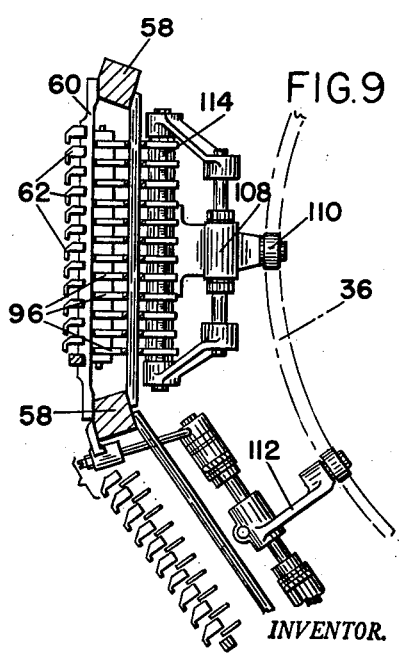

FIGS. 8, 9, and 10 are all plan views, taken on an enlarged scale and looking in the direction of the respective arrows in FIG. 3; and FIG. 11 is a section showing the tablet aligning grooves in the hopper.

The counting and filling of tablets has heretofore formed a problem, particularly in the pharmaceutical industry, for the reason that substantially all other operations as capping, labeling, boxing, etc. may be made at higher speeds than the counting and filling of the containers. The same problem exists also in other industries but the present invention has been illustrated as applied particularly to the pharmaceutical industry for filling tablets accurately as to the count and at a speed commensurate with the speed of the other operations mentioned in order to provide a completely in-line packaging of such tablets, thus increasing the speed of the total operation and reducing the cost of the finished product.

In carrying out the present invention, there have been utilized a series of counting and filling units or heads, which in the present illustration are shown as ten in number, these units or heads being serially mounted on a rotary turret tangentially thereto, and each head includes a series of tablet chutes. In this case, the chutes are shown as vertical, so that the tablets proceed down the chutes by gravity, when counted and released by automatic means, to be deposited in the containers herein illustrated as bottles.

Figure 6:
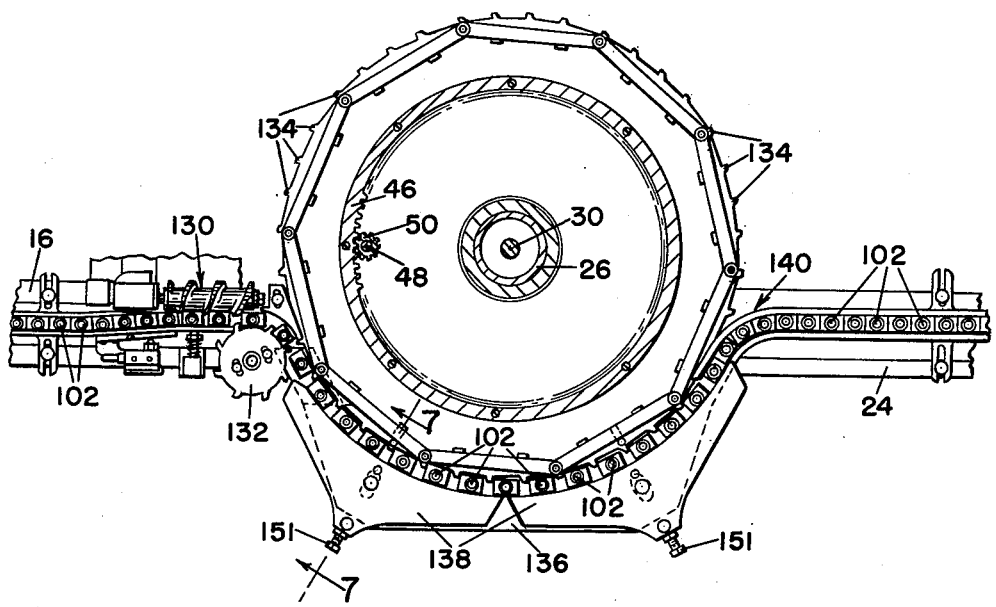
FIG. 6 is a general plan view, taken on the line 6—6 of FIG. 3, this view being turned 90°.

Special reference is made to FIG. 6 wherein the containers are shown as entering substantially on a straight line into an arcuate path conforming to the periphery of the turret, and then passing out again at an opposite point. It is pointed out that these containers are completely filled during their arcuate travel, and that the turret re-charges the chutes during continued motion thereof past this path, as the chutes proceed in their arcuate path in the area where the containers are not present. Mechanism accomplishing this is described below.

Figure 1:
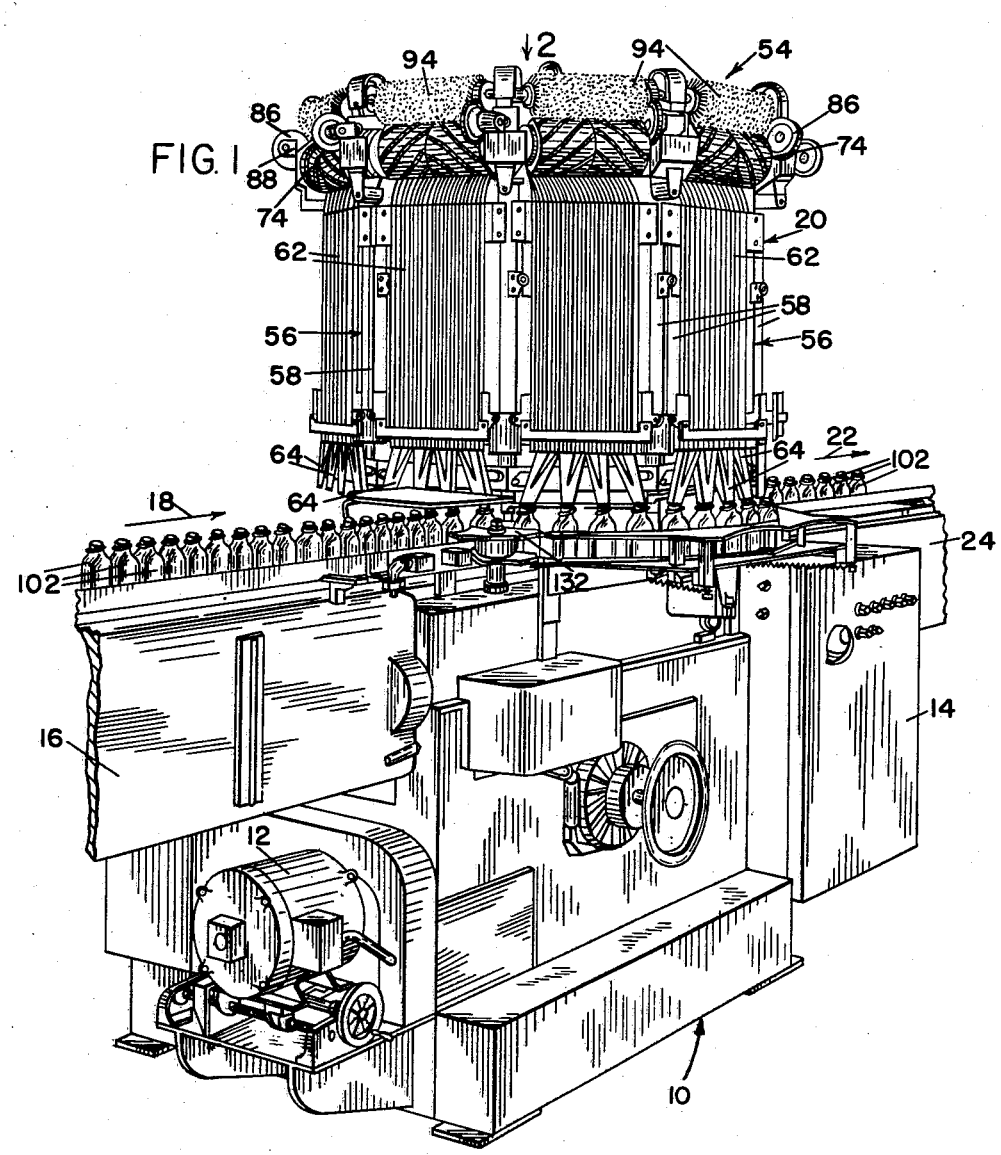
FIG. 1 is a perspective view, parts being broken away, illustrating the machine.

Referring now to FIG. 1, there is shown in general a machine base 10 which is provided with appropriate operating and driving means such as for instance the motor 12 and other motors as may be necessary. Also, there is generally shown a control panel box 14, but it is pointed out that the electric controls and the motors do not form any part of the present invention insofar as they are required to provide for operation of the turret and the counting and filling mechanism.

The machine frame 10 is shown as provided with an initial container support 16, the containers traveling in the direction of the arrow 18 to a point at the periphery of the turret generally indicated at 20, these containers then proceeding at the speed of and on the periphery of the turret (on an arcuate path) for a short period, issuing outwardly from the turret in the direction of arrow 22 along another container support 24 to cottoning, capping, labeling, and boxing machines as may be provided.

Referring to FIG. 3, there is shown a central upright fixed standard 26 which may be mounted on the machine base 10 in any way desired and supported as by brackets or the like 28. This standard is hollow and may provide a support for a vertical shaft 30 used to drive certain parts of the machine. In any event, this standard is fixed and does not rotate but it provides a support for the rotating turret as for instance by vertically spaced bearings 32 and 34. The standard also mounts a series of fixed cams which are generally indicated at 36, 38, 40 and 42, the purpose of which will be explained hereinafter. It is to be noted that cam 36 is substantially circular but cams 38, 40 and 42 extend only at the side of the standard 26 where the containers are filled.

The turret includes a lower member 44 which is in the form of a large strong disc or the like and attached to this disc there is an internal ring gear 46 adapted to be driven from a shaft 48 by a spur gear 50. It is by this means that the turret itself may be rotated. The turret also comprises an upper supporting member generally indicated at 52 mounted on bearing 34 which is in the form of a sleeve and the upper member 52 mounts the lower portion or bottom wall of the hopper which is at the top of the machine. This hopper is generally indicated at 54. The members 44, 46, 52 and 54 all rotate together and the series of tablet chute units connect members 44 and 54 at the periphery of the turret forming a completely enclosed cage-like member rotated by gear 50 at a constant speed.

Each unit, these being indicated generally in FIG. 1 by the reference numeral 56, comprises a substantial frame including uprights such as indicated at 58 in FIG. 9, these uprights in turn mounting cross bars as for instance 60 on which are mounted the tablet chutes 62. The uprights 58 may be used to directly connect members 44 and 54. The chutes are vertical and lead the tablets as is shown in FIG. 3 vertically downwardly from the hopper to the filling spouts which are indicated at 64. The spouts are mounted on brackets 65 depending from member 44.

The member 54, which forms the bottom of the hopper, may be provided with a central dome 66 and it slants downwardly and outwardly toward the periphery of the turret, see FIG. 3, there being provided slots as at 68 to catch dust from the tablets. In the lower areas thereof, the member 54 has a series of slots 70 which are provided in a V form in FIG. 11, allowing the helter-skelter tablets to be aligned therein for further alignment with and deposit in chutes 62 as will be clear to those skilled in the art.

Cooperating with the slots 70, there is a feed roller 74 to each unit, these feed rollers being driven as by chain 76 in a counter-clockwise direction, looking at the left-hand side of FIG. 3. These rollers preferably have rubber coverings and may be ribbed as desired, preventing passage of more than one tablet at a time to any one chute.

Chain 76 may be driven from shaft 30 as by bevel gears 78, shaft 80 and bevel gears 82, shaft 80 rotating with member 52 and being journaled thereon.

The feed rollers 74 are all joined at their ends as by meshed bevel gears 84 which are provided at angles to each other and thus all the feed rollers 74 are driven in the same direction at all times during the rotation of the turret.

Referring now to FIG. 5, there is shown a roller 86 mounted on a bracket 88, in turn mounted on the turret, said roller impinging upon a surface 90 of roller 74 and deriving rotary motion therefrom. This rotary motion is in turn imparted to a roller 92 having thereon cleaning bristles 94 and rotating in the opposite direction to maintain the surface of rollers 74 clean of dust and the like.

Each chute 62 is provided with a stop finger 96 mounted on a pivot and adapted to move forwardly under influence of a spring 98 to close the chute at the moment tablets below finger 96 are released to discharge into a container. There is a lower gate 100 operated in timed relation to finger 96 and this gate releases the tablets in the chute when finger 96 holds the tablets thereabove from descending, thus accurately counting the tablets and providing for the release thereof to pass through spouts 64 into the containers 102. It must be clearly understood that the filling of the containers occurs while the turret is rotating, the containers moving therewith at the same speed.

The gate 100 is reciprocated by means of a bell crank 104 operated by the cam 42, one arm of the bell crank having a roller or the like 106 which rides on the cam at the point in the rotation of the turret when it is desired to release the tablets in the chutes as above described.

The finger 96 is operated in somewhat like manner by means of a lever 108 having a roller 110 which rides on the cam 36 in order to pull the finger back from tablet-stopping position when it is desired to re-charge the chutes. However, finger 96 is of course in tablet-stopping condition when gate 100 is opened.

The machine also includes safety devices, one of which is operated by cams 38 and the other by cam 40. Cam 38 operates a lever 112 in turn operating a finger 114 which at the appropriate moment rises to feel the notch 116 in finger 96. If the spring 98 should move finger 96 forwardly or to the left in FIG. 3, and no tablets were present to be stopped by the finger, then notch 116 would be in a down position where its wall would be engaged by finger 114, and in this position only, an electric switch 118 would be operated to stop the machine. The reason for this is that there must be a tablet in place to be engaged by finger 96, or obviously the chute 62 would not be recharged, due to jamming of the tablets above finger 96.

Cam 40 operates a bell crank 120, which in turn operates a toggle mechanism 122. The toggle operates a bodily movable feeler bar 124. If at the appropriate moment when the feeler bar 124 is moved forwardly, there is a tablet in the chute, this will jam the feeler bar 124 and cause operation of the switch 126 to again stop the machine. Feeler bar 124 ensures that all of the tablets in the chute have dropped out, and it will be of course clear that these mechanisms operate in correct timed sequence in order to ensure proper feeding of the counted tablets in correct amount to the waiting containers.

The containers 102 move to the right, for instance in FIG. 6, and any means may be used to urge the containers along as for instance an endless belt not shown. The containers are in close contact until they enter a spacing device generally indicated at 130 which may assume the form of a helical screw or the like by which means the containers are spaced but still urged forwardly to a transfer wheel 132 having teeth as clearly shown in FIG. 6. The transfer wheel transfers the containers individually and separately and in spaced relation, to the turret itself, which then carries the containers on an arcuate path, but for a portion only of the periphery of the turret as by means of a circular series of teeth 134 on the turret.

The machine base provides a flat arcuate base or supporting plate 136 for the containers, this being best shown in FIG. 7, together with an outboard guiding means which comprises a pair of adjustable plates 138 having arcuate inner edges as clearly shown in FIG. 6, guiding the containers along their arcuate path. The guides 138 may be adjusted for different sizes of containers.

The plate 136 may be conveniently supported upon the machine base on any suitable brackets or the like, and the containers slide along base plate 136 and guide 138 until they are passed outwardly from the turret at the point indicated at 140 in FIG. 6 where they are picked up by another conveying means (not shown) and moved to the right along the support 24 and out of the machine, once again in contacting relationship.

Plate 136 provides the support for plate 138 by means of a post or the like generally indicated as at 142 (see FIG. 7) and a post 144, the latter being slidable in a slot 146 in plate 136. A rod 148 is resiliently urged to the right in FIG. 7 by spring 150 and post 142 being connected thereto, maintains guide plate 138 resiliently in the right-hand position to guide the containers, but in yieldable relationship to accommodate the bottles. A stop screw 151 positions plate 138 relative to plate 136.

Means is provided for shutting off the machine if the hopper above described should become too full. It is pointed out that any continuous or automatic means may be used to supply tablets as through a chute 152 (FIG. 3) so that the tablets are continuously supplied to the machine and the machine may therefore continuously operate. However, if the tablets become too numerous in the hopper, jamming of the feed rolls at 74 may result and therefore a pivoted feeler member or blade 154 is provided in the hopper and this may be mounted in any way desired as on a support 156 mounted on the machine frame in any way. The feeler blade 154 is capable of feeling the tablets and will rise upon a too great supply of the tablets, to operate a micro-switch or the like to shut off the machine.

The spouts 64 are adapted to conduct tablets from a plurality of chutes 62 to the individual containers so as to provide for a larger number of tablets in each container than is contained in any one chute. Thus the containers may be filled to the desired capacity from a series of chutes but without relative motion of chutes and containers. In this respect it will be noted in FIG 10 that the gate 100 comprises a series of stop fingers of different lengths as is indicated at 158 and these fingers allow descent of the tablets in a single line from each of three chutes 62 separately to a single spout 64, only one chute depositing tablets in a spout at any one time.

Referring now to FIG. 3, there are shown tubular passageways 160 which are conveniently located to exhaust broken tablets which may fall through the slots at 72, thus providing that only whole tablets shall proceed to the chutes 62. Also dust and the like is exhausted in this way through apertures at 162 into the central standard 26 and thence to a collection point.

It will be seen that this invention provides for an optimum speed as far as counting and filling tablets is concerned due to the constant rotation of the turret in concert with the individual containers which proceed continuously through the machine at turret speed, and are filled with great rapidity for speeding up the entire packaging operation. This is primarily accomplished by feeding the empty containers into the turret, carrying the containers peripherally with the turret while discharging tablets (or other articles) into the containers, causing removal of the filled containers prior to a full revolution of the turret, and re-charging the chutes in the units of the turret in the path thereof at the opposite side of the machine, i.e., during the part of the unit travel where there are no containers.

I claim:
1. A tablet counting and filling machine comprising a series of filling heads arranged in a circular path and continuously rotated, pockets beneath and rotating with the filling heads to receive the containers to be filled, means for introducing the containers into said pockets to travel for a portion only of the full revolution of the filling heads, means for releasing the load from the filling heads into the containers while the containers are in motion with and beneath the filling heads, means for discharging the filled containers from the pockets, and means for recharging the filling heads prior to again coming into position over empty containers, each filling head including a plurality of chutes, means to count, stop, and deposit the tablets, and means to align the tablets to enter and substantially fill the chutes.

2. A tablet counting and filling machine comprising a support, a series of filling heads arranged generally circularly on the support, means to continuously rotate the support and thus the heads, each head comprising a series of gravity-operated tablet chutes and tablet stopping and releasing means in each chute to count and store a predetermined number of tablets per chute, pockets on the support, said pockets being beneath and rotating with the filling heads and the chutes, said pockets receiving containers to be filled, means for introducing the containers individually into said pockets to travel for a portion only of the full revolution of the filling heads, means operating the tablet releasing means to load the containers while the containers are in motion with the filling heads, means for discharging the filled containers, and means for recharging the chutes of the filling heads during further rotation thereof prior to again coming into position over empty containers and during the rotation of the heads between the container discharging means and the container introducing means.

3. A tablet counting and filling machine comprising a turret, a series of filling heads on the turret, said heads being arranged in a circular manner thereon, each head comprising a series of gravity operated tablet chutes and tablet stopping and releasing means in each chute to count and store a predetermined number of tablets per chute, said chutes being arranged in line on each filling head, means to continuously rotate the turret, means on the turret rotating with the filling heads to receive containers to be filled with tablets, said containers traveling with the filling heads for a portion only of the revolution of the turret, said tablet releasing means being effective to provide for filling the containers while the containers are in motion with the filling heads during said portion of revolution of the turret, means for discharging the filled containers from the turret prior to a full revolution of the filling heads, and means for recharging the filling head chutes after the containers are discharged from the turret.

4. A tablet counting and filling machine comprising a turret, a series of filling heads on the turret, said heads being arranged in a circular manner thereon, each head comprising a series of gravity operated tablet chutes and tablet stopping and releasing means in each chute to count and store a predetermined number of tablets per chute, said chutes being arranged in line on each filling head, means to continuously rotate the turret, means on the turret rotating with the filling heads to receive containers to be filled with tablets, said containers traveling with the filling heads for a portion only of the revolution of the turret, said tablet releasing means being effective to provide for filling the containers while the containers are in motion with the filling heads during said portion of revolution of the turret, means for discharging the filled containers from the turret prior to a full revolution of the filling heads, and means for recharging the filling head chutes after the containers are discharged from the turret, said tablet stopping means being effective during the recharging period of the travel of the filling heads between the container discharging point and the container receiving point, the discharging point and receiving point being located at circumferentially spaced positions with respect to the turret.

5. A tablet counting and filling machine comprising a rotary support, a series of filling heads arranged generally circularly thereon, a series of chutes on each head, means to continuously rotate the support and with it the heads, means forming pockets on the turret beneath and rotating with the respective chutes, said pockets receiving containers to be filled, a container receiving station at a point on the circular path of the heads, means introducing the containers individually into said pockets to travel on said path for a portion only thereof, a container discharge station circumferentially spaced from the container receiving station, means for releasing loads from the chutes into the containers while the containers are in motion with the chutes and during said portion of the path, means for discharging the filled containers from the path at the discharge station, and means for recharging the chutes during further rotation of the support and travel of the filling heads along the remainder of the path of travel of said heads and chutes, and means removably securing the filling heads to the rotary support.

6. A tablet counting and filling machine comprising a turret, a series of filling heads on the turret, said heads being arranged in a circular manner thereon, a series of downwardly extending chutes on each head, tablet stopping and releasing means for each chute, an entrance groove for each chute at an angle thereto, means to continuously rotate the turret, pockets on the turret beneath and rotating with the filling heads to receive containers to be filled, means for introducing the containers into said pockets to travel with the heads for a portion of the full revolution of the turret, means for releasing tablets from the filling head chutes into the containers while the containers are in motion with the filling heads, means for discharging the filled containers from the turret prior to a full revolution of the filling heads, and means for recharging the filling head chutes after the containers are discharged and prior to the start of the next cycle of the turret, said recharging means including a hopper at the top of the turret, a rotating roll for each filling head, each roll being located on an axis at right angles to the chutes and at the juncture of the grooves and chutes.

7. The machine of claim 6 wherein the entrance grooves are located in the hopper and form a partial bottom therefor at an incline to the horizontal, said grooves leading down the incline to the chutes.

8. The machine of claim 6 including means to drive one roll, said rolls being operatively interconnected, and rotating each other in a closed, generally circular path.

9. The machine of claim 6 including tablet feeding means to the hopper, a power switch and a vertically movable paddle in the hopper to operate the switch between on and off positions according to the position of the paddle above the grooves, said switch controlling the tablet feeding means and causing it to be inoperative upon the rise of tablets in the hopper to a certain predetermined level.

10. A tablet counting and filling machine comprising a series of filling heads arranged in a circular path and continuously rotated, tablet chutes on the heads, pockets beneath and rotating with the filling heads to receive the containers to be filled, means for introducing the containers into said pockets to travel for a portion only of the full revolution of the filling heads, means for releasing the load from the filling head chutes into the containers while the containers are in motion with and beneath the filling heads, means for discharging the filled containers from the pockets, and means for recharging the filling head chutes prior to again coming into position over empty containers, means in each chute to count, stop, and deposit the tablets, and means to align the tablets to enter and substantially fill the chutes, said aligning means comprising a rotating holder on each head at the upper end of the chute, the rollers being arranged between the grooves and chutes, and each groove being in the form of a V to receive and align the tablets, the rollers preventing the passage thereunder of non-aligned tablets.

11. A tablet counting and filling machine comprising a series of filling heads arranged generally circularly, means to continuously rotate the heads, pockets beneath and rotating with the filling heads to receive containers to be filled, means for introducing the containers individually into said pockets to travel continuously on an arc for a portion only of the full revolution of the filling heads, means for releasing loads from the filling heads into the containers while the containers are in motion with the filling heads, means for discharging the filled containers from the arced path, means for recharging the filling heads during further rotation thereof prior to again coming into position over empty containers and during the rotation of the heads between the container discharging means and the container introducing means, said last-named means including a single hopper magazine in the turret above the filling heads, said hopper directly recharging all the heads, chutes on each head to receive the tablets from the hopper, and tablet-aligning chutes in the hopper leading to the chutes in the heads.

12. The machine of claim 11 wherein said hopper and its chutes rotate in fixed relation to the feeding head chutes.

References Cited in the file of this patent

UNITED STATES PATENTS

| | | |
|---|---|---|
| 986,777 | Standish | Mar. 14, 1911 |
| 1,409,211 | Anderson et al. | Mar. 14, 1922 |
| 1,850,522 | Wessman | Mar. 22, 1932 |
| 2,585,558 | Lakso | Feb. 12, 1952 |